Nov. 15, 1960 D. A. KATKO ET AL 2,959,990
TREPANNING MACHINE
Filed Dec. 31, 1958 3 Sheets-Sheet 1

INVENTORS
Daniel A. Katko &
Anthony P. Sgambati.
BY
ATTORNEY

Nov. 15, 1960  D. A. KATKO ET AL  2,959,990
TREPANNING MACHINE
Filed Dec. 31, 1958  3 Sheets-Sheet 2

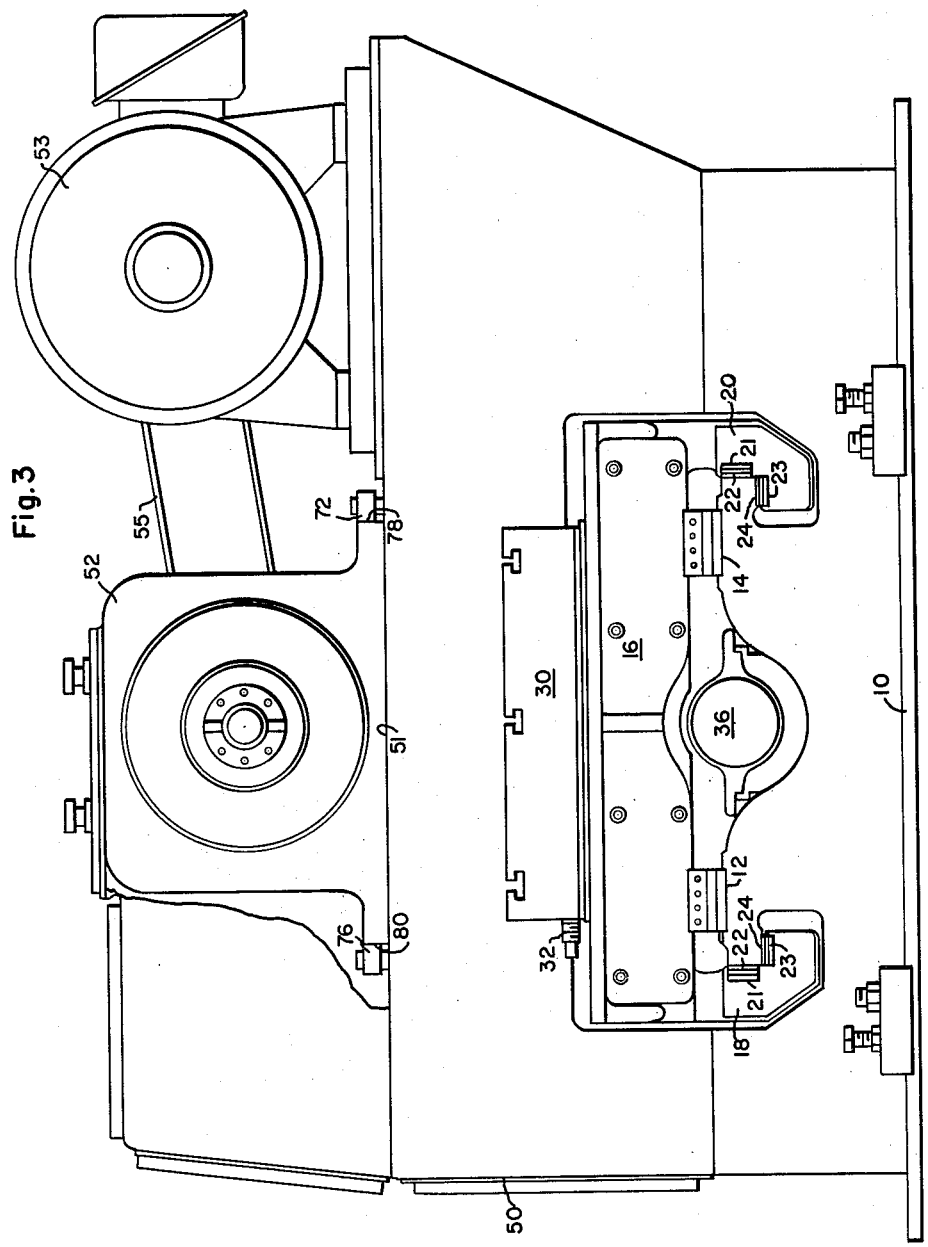

United States Patent Office 2,959,990
Patented Nov. 15, 1960

2,959,990

TREPANNING MACHINE

Daniel A. Katko, Youngstown, and Anthony P. Sgambati, Campbell, Ohio, assignors to Lombard Corporation, Youngstown, Ohio, a corporation of Ohio Filed Dec. 31, 1958, Ser. No. 784,175

3 Claims. (Cl. 77—31)

This invention relates to a machine for coring holes in a solid workpiece and more particularly to a machine of the type described which is adapted to core especially deep holes of large diameter.

Generally speaking, a trepanning machine is a type of horizontal boring mill in which a hole is produced in a workpiece by removing a core therefrom. This is accomplished by cutting a circular groove in the workpiece with an annular tool mounted on the end of a rotating tubular tool holder or spindle. As the annular tool moves further into the workpiece and the circular groove produced thereby becomes deeper, a core is formed. The tool and its associated tubular holder slide over this core until the tool has cut through the entirety of the workpiece, at which time the core is freed of the workpiece and may be removed from the interior of the tubular tool holder. A trepanning machine of this type has various advantages among which are improved surface finish, greater tool life and greater accuracy in the straightness of the finished bore.

The trepanning machine consists, essentially, of an elongated track which carries a workpiece-supporting carriage for reciprocating movement. At one end of the track is a structure which supports a bearing housing for a hollow spindle rotatable about a horizontal axis extending parallel to the aforesaid track. One end of the hollow spindle is adapted to receive an annular cutting tool, the arrangement being such that the workpiece is moved into engagement with the cutting tool as the aforesaid carriage moves toward the bearing housing. It is of prime importance that the spindle be exactly parallel to the track since otherwise the annular cutting tool will bind against the bore during a cutting operation. Since an exactly parallel condition cannot be guaranteed due to manufacturing tolerances, some means must be provided for adjusting the angular position of the spindle with respect to the track.

The present invention has as its primary object the provision of means in a trepanning machine for adjusting the angular position of the aforesaid tubular spindle with respect to the path of the workpiece.

Another object of the invention lies in the provision of means in a trepanning machine for adjusting the transverse position of its tubular spindle with respect to the central axis of the aforesaid track.

More generally, an overall object of the invention is to provide a new and improved trepanning machine.

The above and other objects and features of the invention will become apparent from the following detailed description taken in connection with the accompanying drawings which form a part of this specification and in which:

Fig. 3 is an end view of the apparatus shown in Fig. 1.

Figure 1:
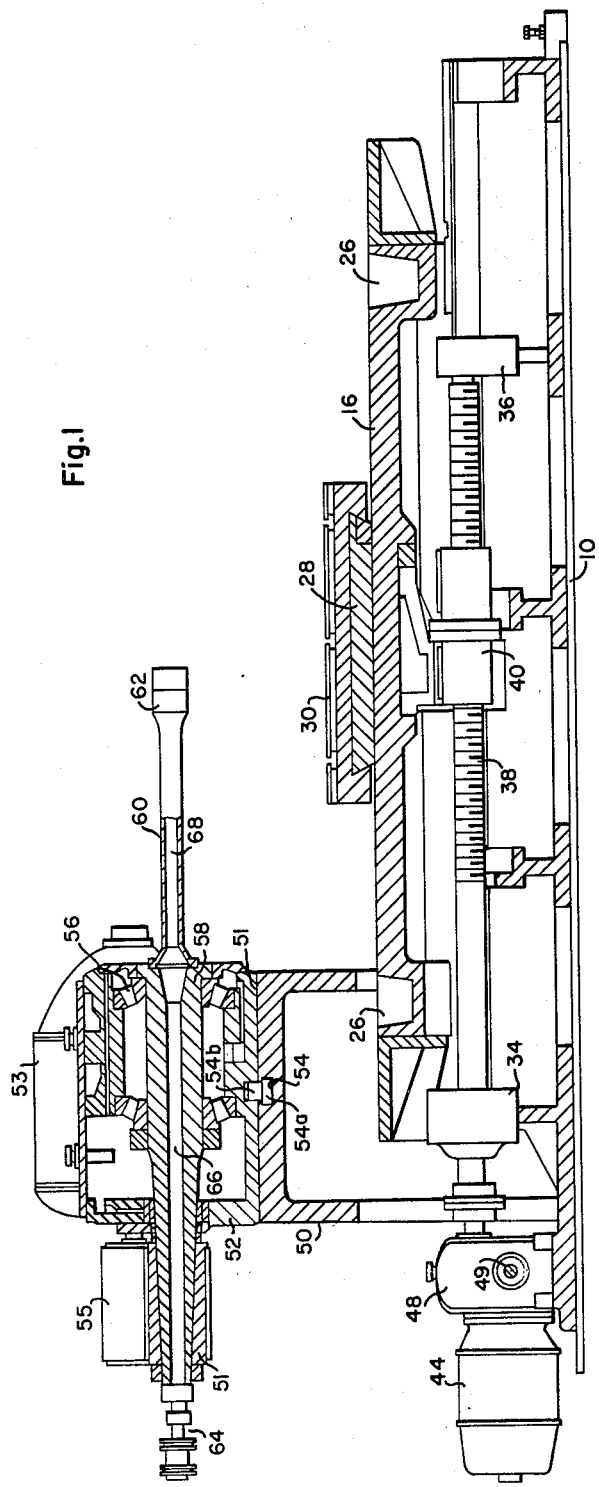
Figure 1 is a cross sectional side view of the trepanning machine of the present invention.

Referring to Figs. 1 and 3, the trepanning machine shown comprises a base member 10 which supports two guideways or tracks 12 and 14. Mounted on the tracks 12 and 14 for reciprocating movement is an elongated workpiece-supporting carriage 16. The carriage 16 has a pair of downwardly extending arms 18 and 20 each of which is provided with adjustable wedges 21 and 23 which engage wear strips 22 and 24 extending along the length of the base 10 for the purpose of guiding the longitudinal movement of the carriage 16 along tracks 12 and 14. As shown, the carriage 16 is cast and incorporates a trough 26 around its periphery which serves to catch lubricating cutting oil applied to the cutter of the trepanning machine and return it to a sump in a lubricating oil system, not shown. Positioned on top of the carriage 16, essentially in the middle thereof, is a plate 28 which carries, for sliding movement, a table 30. As illustrated, the position of the table 30 may be adjusted to the left or right as shown in Fig. 3 by turning an adjusting screw 32.

Carried at either end of the base 10 are a pair of bearings 34 and 36 which, in turn, support the ends of a rotatable screw 38. The screw is operatively connected to the carriage 16 by means of a ball screw unit 40, the arrangement being such that as the screw 38 turns in one direction or the other the ball screw unit 40 will move toward the left or right and thereby cause the carriage 16 to likewise traverse the tracks 12 and 14.

Figure 2:
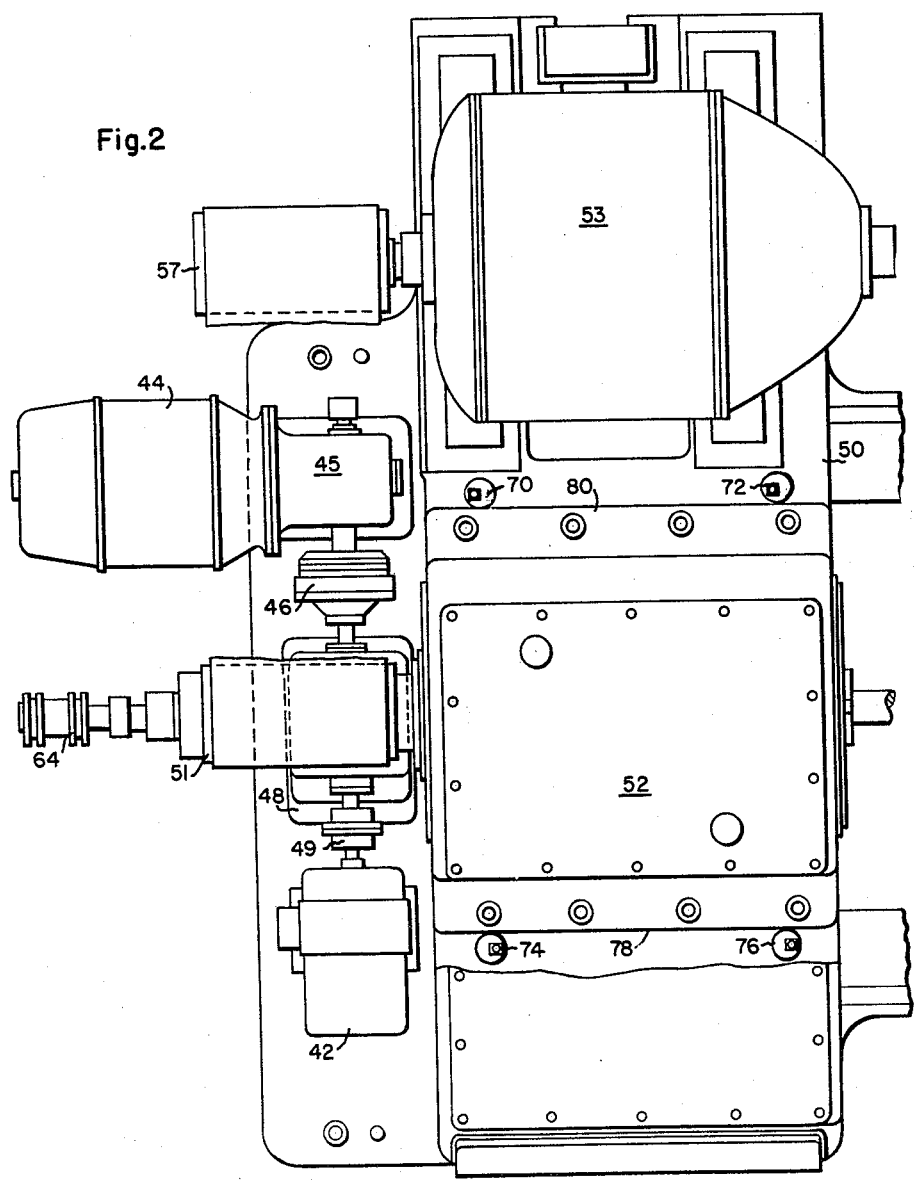
Fig. 2 is a broken away top view of a portion of the apparatus shown in Fig. 1, showing the means for adjusting the angular position of the hollow spindle of the trepanning machine.

As shown in Fig. 2, two motors 42 and 44 are provided to drive the screw 38. Motor 44 constitutes the main drive for the screw and is connected thereto through a gear reducer 45, clutch 46 and gear reducer 48. Motor 42 is used as a rapid traverse drive and is likewise connected to the screw 38 and the gear reducer 48 through shaft 49. In the operation of the apparatus, the carriage 16 may be rapidly moved to the left or right as shown in Fig. 1 by motor 42. During this time, clutch 46 disengages gear reducer 45 and motor 44. However, during a trepanning operation, clutch 46 connects the motor 44 and gear reducer 45 to gear reducer 48 and screw 38 for slow travel of the carriage 16. During this time, the motor 42 is inoperative; but its rotor is forced to rotate harmlessly by virtue of the fact that there is no means of disconnecting it from the gear reducer 48.

At the left end of base member 10 as shown in Fig. 1 is a housing structure 50 which supports a bearing housing 52 and a drive motor 53. The upper surface 51 of housing 50 is substantially flat and is provided with a transversely-extending slot 54 which receives, for sliding movement, a block or key 54a having a pivot pin 54b extending upwardly therefrom. The bearing housing 52 is adapted to move to the left or right of the central axis of carriage 16 and to rotate about the pivot pin 54b while its lower surface slides on the upper flat surface 51 of housing 50, substantially as shown.

It will be seen from Fig. 1 that the bearing housing incorporates a bearing 56 within which is journalled a hollow rotatable spindle 58. The right end of the spindle 58 is adapted for connection to a tubular tool holder 60 which carries at its right end an annular cutting tool 62. The other end of spindle 52 is provided as shown with a pulley 51 which is connected through a belt 55 to a pulley 57 on the drive motor 53. Cutting oil supplied from a pump, not shown, is conveyed through rotary joint 64 and passages 66 and 68 in spindle 58 and holder 60, respectively, to the cutting edge of the annular tool 62.

The present invention is concerned with the means for adjusting the angular position of the spindle 58 with respect to the long transverse dimension of carriage 16. It comprises four eccentric devices 70, 72, 74 and 76 which abut against vertical flat surfaces 78 and 80 positioned on either side of the bearing housing 52 as shown in Fig. 3. Thus, when the eccentrics are rotated, the bearing housing 52 will be forced to rotate about pivot pin 54 so that the spindle 58 and work holder 60 may be perfectly aligned with the direction of movement of carriage 16. Likewise, the bearing housing 52 may be made to move to the right or left by adjustment of the eccentrics which, in turn, cause the key 54a to slide in slot 54. If, for example, it is desired to rotate housing 52 in a counter-clockwise direction as shown in Fig. 2, eccentrics 70 and 76 will be rotated clockwise about their axes while eccentrics 72 and 74 will be rotated in a counterclockwise direction. If the direction of rotation about pin 54 is reversed so as to be clockwise, the respective eccentrics will also be rotated in directions opposite to those described above. If it is desired to move the bearing housing 52 and tool holder 60 upward as shown in Fig. 2, eccentrics 74 and 76 will be rotated clockwise and eccentrics 70 and 72 will be rotated counter-clockwise. Downward movement is likewise accomplished by rotating eccentrics 70 and 72 clockwise and eccentrics 74 and 76 counter-clockwise.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a machine of the type having a cutting tool mounted on the end of a rotatable spindle and a workpiece-supporting carriage movable along a path extending parallel to the axis of said spindle whereby a workpiece may be moved into and out of engagement with said cutting tool; the combination of a supporting structure for said spindle, said structure having a substantially flat surface and a pivot pin extending outwardly from the surface, a bearing housing for said spindle mounted on said surface for pivotal movement about said pin, surfaces on said bearing housing extending in a direction which is substantially parallel to said pivot pin, said surfaces being spaced on the housing whereby a force directed against one surface will cause the housing to rotate in one direction about the pivot pin while a force directed against the other surface will cause the housing to rotate in the opposite direction about the pivot pin, and circular members mounted for eccentric movement about axes extending outwardly from said surface, said members being positioned such that their peripheries will engage said surfaces on the housing whereby rotation of the circular members about their eccentric axes will adjust the angular position of said bearing housing and the spindle carried thereby.

2. In a machine of the type having an annular cutting tool mounted on the end of a spindle rotatable about a horizontal axis and a workpiece-supporting carriage movable along a path extending parallel to the horizontal axis of said spindle whereby a workpiece may be moved into and out of engagement with said annular cutting tool; the combination of a supporting structure for said spindle, said structure having an upper substantially flat horizontal surface and a pivot pin extending upwardly therefrom, a bearing housing for said spindle mounted on said surface for pivotal movement about said pin, two vertical surfaces on said housing extending in a direction which is parallel to the axis of said spindle on either side thereof, and four eccentrics rotatable about vertical axes extending upwardly from said horizontal surface, each of said eccentrics being positioned to engage one end of a cooperating one of the vertical surfaces on said bearing housing whereby rotation of the eccentrics will adjust the angular position of said spindle with respect to the path of movement of said workpiece-supporting carriage.

3. In a machine of the type having an annular cutting tool mounted on the end of a spindle rotatable about a horizontal axis and a workpiece-supporting carriage movable along a path extending parallel to the horizontal axis of said spindle whereby a workpiece may be moved into and out of engagement with said annular cutting tool; the combination of a supporting structure for said spindle, said structure having an upper substantially flat horizontal surface, a keyway in said surface extending perpendicular to the central axis of the path of said carriage, a key slidable in said keyway and a pivot pin extending upwardly from said key, a bearing housing for said spindle mounted on said surface for pivotal movement about said pin, and eccentrics rotatable about vertical axes for engaging vertical surfaces on said bearing housing whereby rotation of said eccentrics will cause said key to slide in said keyway and cause said bearing housing to pivot about said pivot pin.

References Cited in the file of this patent

UNITED STATES PATENTS

| | | |
|---|---|---|
| 1,196,024 | Porter et al. | Aug. 29, 1916 |
| 1,685,899 | Andrew | Oct. 2, 1928 |
| 2,841,039 | Stastny | July 1, 1958 |